United States Patent Office 3,535,930
Patented Oct. 27, 1970

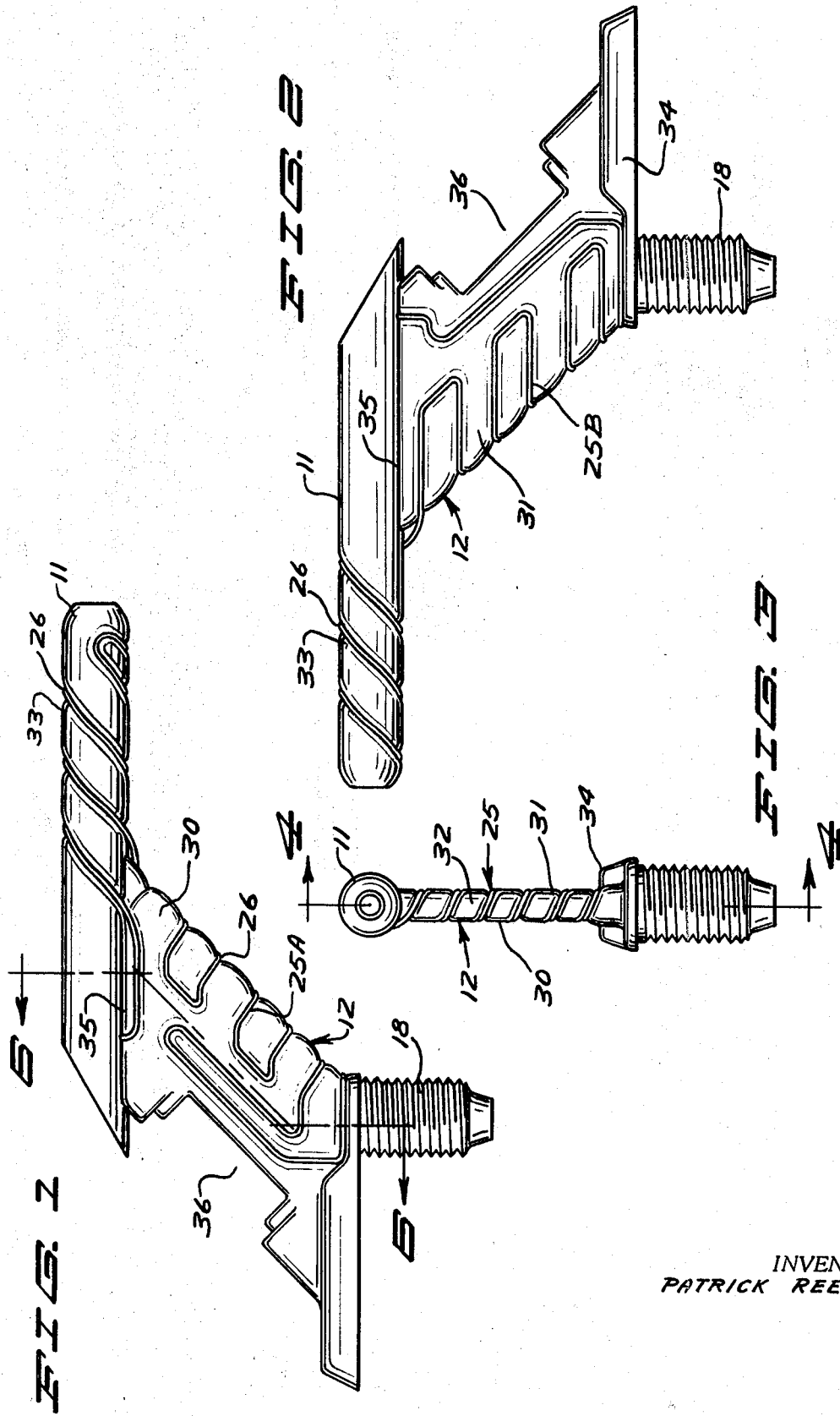

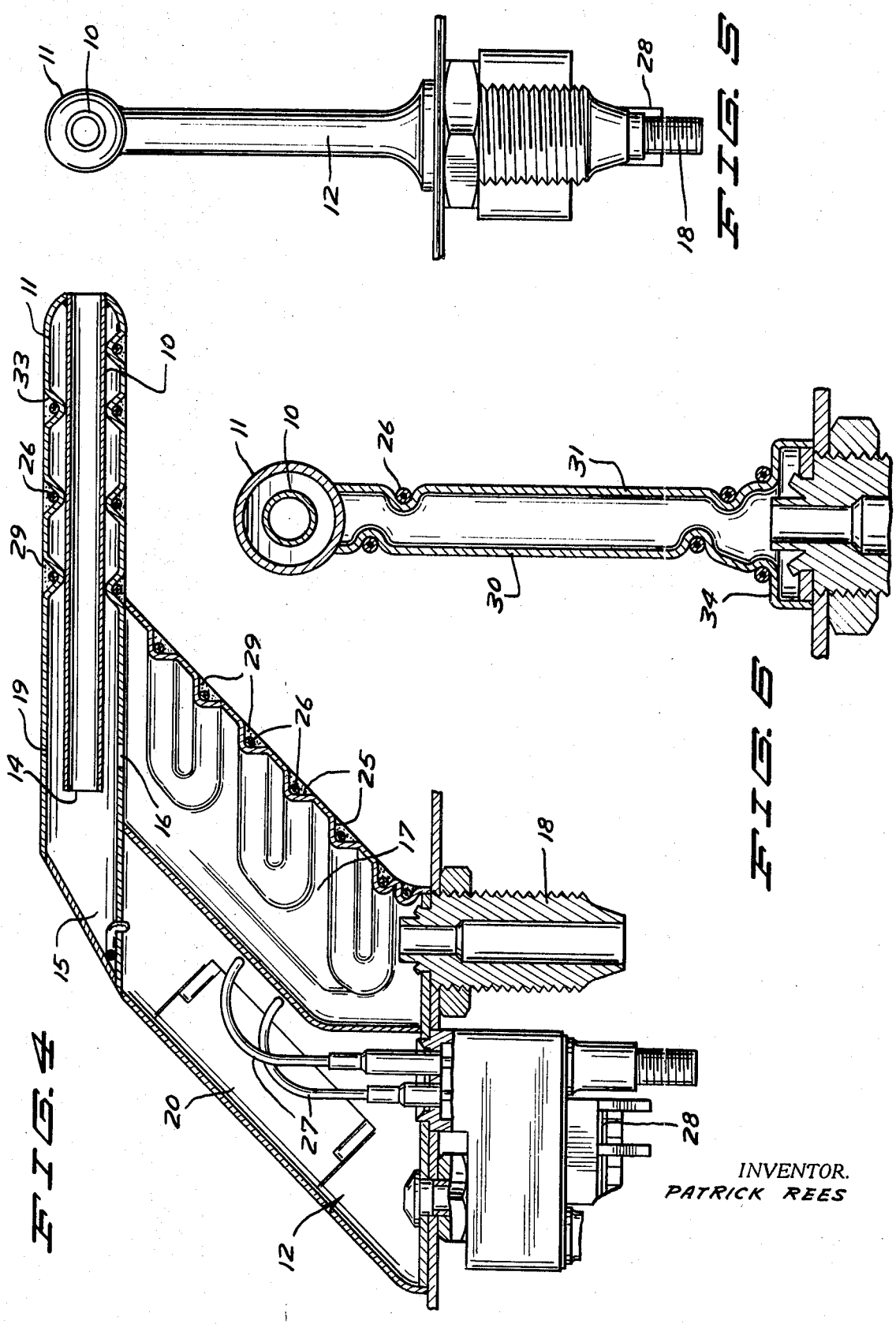

3,535,930
AERODYNAMIC COMPONENTS MOUNTED EXTERNALLY ON AN AIRCRAFT
Patrick Rees, Minnetonka Beach Village, Minn., assignor to Rosemount Engineering Company Limited, Bognor Regis, Sussex, England, a British company
Filed July 24, 1967, Ser. No. 655,473
Claims priority, application Great Britain, July 26, 1966, 33,604/66
Int. Cl. G01f 1/00
U.S. Cl. 73—212
10 Claims

ABSTRACT OF THE DISCLOSURE

An aerodynamically shaped component, for example, a pitot or pitot-static tube assembly on a short mast, has a metal sheathed heating element on the outer surface of a body such as the mast; the form and shape of the body are determined in accordance with the functional and strength requirement and the heating element is secured in position by metal spraying. The sprayed metal is built up to provide required outer profile for the component.

---

This invention relates to aerodynamically shaped components which are mounted externally on an aircraft. It is often necessary to heat such components to prevent ice accretion and the present invention has for its principal object to provide an improved manner of effecting such heating.

According to this invention, a method of making an aerodynamically shaped component such as a strut to be mounted externally on an aircraft comprises the steps of first forming the component from uniform thickness metal into a desired shape and then making a groove for a heating element on the component by indenting the component and maintaining the uniform thickness wall in the indentations. The components are then welded or otherwise suitably fixed together to form the desired shape, the heating elements are laid in the provided indentations or grooves and then a layer of metal is sprayed over the surface of the assembly to bond the element to the surface and to build up the sprayed material to provide the required outer profile for the component. The metal spray is usually built up to just fill in the indentations or grooves for the heaters, except perhaps in leading and trailing edge areas where the surface profile may vary from the base structure. After the surface has been built up by spraying, it may be finished by conventional machining techniques.

By this method, the heating element, which conveniently may be constructed as described and claimed in the specifications of British Pat. No. 1,031,863 or 1,058,496, is mounted as close as possible to the outside surface of the component. This is desirable in obtaining a good de-icing performance; it moreover avoids any weakening of the structure as would be required if the heater were mounted from the inside since the only way then to bring it into close proximity with the outer surface to be de-iced is by having a very thin wall. This technique moreover facilitates de-icing of very thin members such as struts, i.e. members of small external cross sectional dimensions, since it is not necessary to have access to the interior of the member.

The use of the metal spraying technique enables the heating element to be attached where required to the outer surface and only the necessary region of the structure need be built up. With metal spraying, it is not necessary to raise the temperature of the structure to any great extent and so distortion is avoided.

The invention furthermore includes within its scope an aircraft instrument component to be mounted externally on an aircraft comprising an inner body the form and shape of which may be determined in accordance with the functional and strength requirement of the component, and a metal sheathed electric heating element laid on the outer surface of said inner body, the heating element being secured in position by metal spraying, the metal being built up by spraying to form a smooth outer surface to the component.

This invention is particularly applicable to pitot and pitot-static tubes of the kind carried on a short mast so as to space the pitot tube away from the aircraft structure.

It has previously been proposed to use the hollow interior of the mast as a moisture collecting chamber between the pitot tube and the air line to the indicating apparatus, a heater coil being provided within the hollow interior of the mast and tube housing to prevent ice formation.

According to another aspect of this invention, in a pitot or pitot-static tube assembly of the kind having a short mast carrying a pitot or pitot-static tube, the mast is heated by an electric heater consisting of a heating element within an insulated covering around the outside of the mast, the heater being secured in position by metal spraying, the metal being built up by spraying to form a smooth outer surface to the mast. By this construction, the mast can have a smooth streamline shape. It is heated however, from the outer surface where the heating is most effective in preventing or eliminating ice formation on the mast.

The pitot or pitot-static tube assembly shown, includes the external heaters mounted onto the pitot tube housing itself by the same techniques, namely providing grooves in the surface of the pitot tube housing into which the electric heating element is laid, and after which metal is sprayed onto the tube to bring the outer surface of the tube in the groove areas in line with the other surfaces of the tube and then the tube is finished to present a smooth outer surface.

The interior of the mast is preferably arranged to constitute a plenum chamber.

The following is a description of one embodiment of the invention, reference being made to the accompanying drawings in which:

FIG. 1 is a side elevational view of an aerodynamic body made according to the present invention in an initial stage of fabrication; and shown inverted;

FIG. 2 is a side elevational view of the device of FIG. 1 as viewed from an opposite side thereof;

FIG. 3 is a front elevational view of the device of FIG. 2;

FIG. 4 is a sectional view taken as on line 4—4 in FIG. 3, after the unit has been completely manufactured;

FIG. 5 is a front elevational view of the device of FIG. 4; and

FIG. 6 is an enlarged sectional view taken as on line 6—6 in FIG. 1.

Referring to the drawings, first particularly to FIGS. 4 and 5, there is shown a pitot pressure sensing device for mounting on an external under surface of an aircraft with pitot tube 10 within an outer housing 11 carried below the aircraft surface on a short sloping strut or mast 12. The strut 12, as seen in FIG. 5 is of narrow width, narrower than the housing 11; it is shaped generally to have a low drag aerodynamic form. The tube 10 extends for the greater part of the length of the housing 11. At its rear end 14, the tube 10 opens into a chamber 15 which communicates, via an aperture 16, with a plenum chamber 17 constituted by the forward portion of the interior of the strut 12. This plenum chamber constitutes a region in which the inrush of air is allowed to settle at low velocity to smooth out any transient oscillations. The plenum chamber 17 is connected, via a tube 18 to an indicating instrument (not shown). Any water entering the tube 10 collects in the chamber 15 and is removed by a drainage hole, such as the hole 19 in FIG. 4.

The plenum chamber 17 is separated by a bulkhead from a rear chamber 20 containing the electrical connections; the bulkhead separates the two chambers and also increases the rigidity of the strut.

As is seen in FIG. 4, the forward surfaces of the strut 12 and the forward portion of the side surfaces thereof as well as the outer surface of the housing 11 are formed with shallow grooves arranged to form a continuous channel 25 in which is laid an insulated and metal sheathed heating element 26. The element 26 is preferably constructed in the manner described and claimed in the specifications of British Pat. No. 1,031,863 or 1,058,496. The element 26 is secured in position by spraying metal using flame or plasma techniques so as to bond the element to the wall of the strut 12 and to build up the sprayed material shown at 29 to provide a smooth outer surface of the required aerodynamic shape. The external surface, after being built up by metal spraying, is finished by normal machining techniques.

The element 26 is electrically energized through wires 27 from a connector 28.

In the initial stages of manufacture, as shown in FIGS. 1, 2, 3 and 6, the outer housing 10 and the mast 12 are formed so that the grooves 25 that form a continuous channel for the heating element will not weaken the walls of the mast or strut and still provide adequate depth for the heating elements as well as ease of installation of the heaters.

The mast or strut 12 is initially made of two separate shell sections 30 and 31. These shell sections 30 and 31 are of uniform wall thickness and the grooves 25 are formed therein in the desired configuration with suitable dies in each section, for example 25A on section 30 and 25B on section 31. As shown, in FIG. 6, these grooves maintain the uniform wall thickness of the strut after forming. The grooves are formed so that the forward ends of the grooves on section 30 align with the forward ends of the grooves on section 31 when the two halves are placed together, as shown in FIGS. 1-3. When the shell sections 30 and 31 mate along their front junction line 32, the grooves 25A and 25B form the continuous channel 25 in which the heating element 26 is laid.

The tube outer housing 11 has a groove 33 formed therein in the shape of a bifilar helix so that the heating element 26 can be wound in this groove 33 externally on the tube housing. This then eliminates the need for winding internal heaters inside the housing and around the pitot tube 10, which is an extremely difficult job. Once the two shell sections 30 and 31 and the housing 11 have been formed so that their grooves are properly made, the housings 30, 31 are placed together as shown in FIGS. 1-3 and are welded along their junction line 32. These sections are formed with an integral mounting base 34. Then the housing 11 is welded in place along junction lines 35 so that the housing 11 mates to both of the sections 30 and 31 and so that the groove 33 formed in the housing 11 is properly aligned with respect to the grooves 25A and 25B on the strut 12. The unit is cleaned and the heating element 26 is wound into the grooves and temporarily held in place in a suitable manner. The groove 33 forms part of the channel 25 for the heating element.

An open section 36 in the strut is closed with a suitable member and this too is welded into place. After this, the surface of the strut 12 and of the housing 11 are sprayed with metal so that the channel 25 is substantially filled (on both the housing 11 and the strut) and very little more. Also, the sprayed up metal fills in irregularities and makes a slight filling at the leading edge along junction line 32 of the strut.

The method of assembly in this manner eliminates the need for castings which are many times used for mounting struts and other aerodynamic bodies and further makes it easier to mount the heating elements on the outer housings 11 for pitot or pitot-static tubes. The heating elements on the tube as well as on the strut are near the surface where the icing occurs which is desirable.

In making both the strut and the outer housing grooves, the grooves are initially formed in a body made of a metal having uniform thickness from a rolled metal. Cast metal sections have to be heavier than rolled metal sections to get equivalent strength.

The heating element shown on the outside of the pitot tube housing 11 could be separated from element 26 and extended in axial direction in provided grooves so that the full length of the housing itself is covered by heating elements instead of threading the heating coil down onto the strut as is shown in the illustrative embodiment. The grooves can be formed in the components using known procedures.

In summary, after the shell sections have been welded up to make a mechanically strong and leakproof plenum chamber, the outer surfaces of the tube and the strut are cleaned, and the heating element is then laced into the channels formed by the grooves. The heater is secured temporarily by mechanical means. The unit is then thoroughly cleaned again either by degreasing or using a light dry grit blasting. Depending on the material that is going to be sprayed on for a final coating, a bond coating of material such as nickel aluminide can be sprayed over the unit in this stage in order to give a good bond for further coatings. The bond coating holds the heating element in place and adheres very well to stainless steel. Then the filler material is sprayed in place and this can be copper, aluminum, aluminum bronze or similar materials. When the unit is filled with the desired depth, the deposited material is machined away in order to give the desired profile.

In some instances, the struts can be built up in certain areas in order to increase the strength of the unit.

Mounting the heaters in this manner insures that there is very little blind threading of heaters into the interior of small diameter members and also insures that the heating element is close to the surface that is to be deiced.

By the old methods of casting the components and brazing in the heaters, the materials that can be used were necessarily limited to those metals which could be cast and brazed. For example, if titanium is used, it is very difficult to braze and the present techniques work well. Several of the high strength aluminum alloys are difficult to braze as well.

In any structure carrying a bonded heater, the problem of retaining a good bond is present. Part of this is because the support sections are light, there may be warpage that tends to loosen the bond. By proper orientation of the grooves or channels the light metal sections used will be made more rigid to increase its resistance to warpage thus maximizing the strength to weight ratio of the unit and additionally obtaining the benefits of easy installation of the heating element and placing it close to the surface to be de-iced.

Although a pitot tube has been more particularly described, a similar arrangement may be employed for heating pitot-static tubes and other devices carried for aircraft. It may be applied, for example, to the heating of a short mast or strut for carrying an ice detector (e.g. an ice detector as described in the specification of U.S. Pat. No. 3,341,835) or a total temperature sensor.

What is claimed is:

1. A method of making a component to be mounted externally on an aircraft in the airstream and subjected to icing conditions, comprising the steps of laying a metal sheathed electric heating element on the outer surface of an inner body, the form and shape of which are determined in accordance with the functional and strength requirements of the component, and spraying metal over said surface and heating element to bond the element to the surface and to build up the sprayed material to provide the required outer profile for the component.

2. The method as claimed in claim 1 including the further step of finishing the sprayed outer surface by machining.

3. The method as claimed in claim 1 wherein the inner body is of uniform wall thickness metal, and wherein the step of forming heating element receiving grooves in the body is performed prior to laying the heating element on the outer surface, and wherein the heating element is laid into the grooves.

4. The method of claim 1 wherein the inner body includes a strut for holding an environmental sensor, and wherein the inner body is formed by cutting shell sections from a sheet of metal having uniform thickness, deforming grooved channels into the shell sections for receiving the heating element, and joining the shell sections to form an aerodynamic body having an internal cavity before the heating element is placed on the outer surface.

5. The method of claim 4 wherein the inner body includes a tubular member mounted on a strut and wherein the steps include forming a groove in the wall of the tubular member, attaching the tubular member to the joined shell portions, and laying the heating element in the groove on the tube and the shell portions prior to spraying the metal on the inner body.

6. A component to be mounted externally on an aircraft comprising an inner body, the form and shape of which are determined in accordance with the functional and strength requirements of the component, and a metal sheathed electric heating element on the outer surface of said inner body, means to secure the heating element in position comprising a layer of metal sprayed on the surface of the assembly, the metal being built up by spraying to form a smooth outer surface to the component.

7. A component as claimed in claim 6 and means forming grooves in the outer surface of said inner body, said heating element being positioned within said grooves.

8. An aircraft instrument assembly of the kind having a short mast carrying a sensing tube, which assembly comprises a mast, and an electric heater for the mast, said heater consisting of a heating element within an insulated covering mounted around the outside of the mast, means to secure the heater in position comprising a layer of metal sprayed over the mast and heating element, the metal being built up by the spraying to form a smooth outer surface to the mast.

9. An aircraft instrument assembly as claimed in claim 8 wherein the interior of the mast is arranged to constitute a plenum chamber.

10. An aircraft instrument assembly as claimed in claim 8 and means defining a continuous groove extending over at least the forward facing surface of the mast and wherein the heater is an elongated element secured in said groove by metal spraying.

References Cited

UNITED STATES PATENTS

| 2,205,543 | 6/1940 | Rideau et al. | 244—134 |
| 2,509,944 | 4/1952 | Cowdrey et al. | 244—134 |

FOREIGN PATENTS

| 1,073,051 | 6/1967 | Great Britain. |

RICHARD C. QUEISSER, Primary Examiner

J. K. LUNSFORD, Assistant Examiner

U.S. Cl. X.R.

244—134